United States Patent [19]

Lunden

[11] 4,057,150
[45] Nov. 8, 1977

[54] LUMBER STACKING APPARATUS

[76] Inventor: Sidney L. Lunden, c/o Lunden Industries, Inc., Bldg. N7D, Spokane, Wash. 99216

[21] Appl. No.: 724,325

[22] Filed: Sept. 17, 1976

[51] Int. Cl.² ............................................. B65G 57/10
[52] U.S. Cl. ........................ 214/6 DK; 214/DIG. 10; 271/189
[58] Field of Search ............... 214/6 DK, 6 M, 6 H, 214/DIG. 10; 271/189, 191, 218

[56] References Cited

U.S. PATENT DOCUMENTS

| | | | |
|---|---|---|---|
| 3,437,215 | 4/1969 | Lunden | 214/6 DK |
| 3,679,072 | 7/1972 | Mueller | 271/218 |
| 3,737,052 | 6/1973 | Lunden | 214/6 DK |
| 3,737,053 | 6/1973 | Lunden | 214/6 DK |
| 3,860,128 | 1/1975 | Lunden | 214/6 M |

*Primary Examiner*—Robert J. Spar
*Assistant Examiner*—Ross Weaver
*Attorney, Agent, or Firm*—Wells, St. John & Roberts

[57] ABSTRACT

A lumber stacking apparatus is described for picking up a course of boards at a course pickup station and moving the course toward to a course stacking station over a stack and depositing the course on the stack. The apparatus includes a general frame having a carriage mounted thereon for reciprocating swinging movement between the two stations. The carriage is movably supported by parallelogram linkage. A crank drive is connected between the frame and the carriage for swinging the carriage back and forth between the station while maintaining the carriage horizontal. The swinging movement of the carriage converts potential energy of the carriage to kinetic energy during the initial portion of the forward and rearward strokes and converts kinetic energy of the moving carriage back to potential energy during the end of the strokes. Such a conversion drastically reduces the peak energy required to drive the carriage.

6 Claims, 3 Drawing Figures

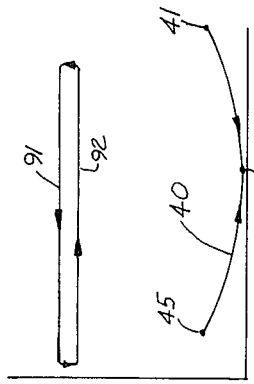
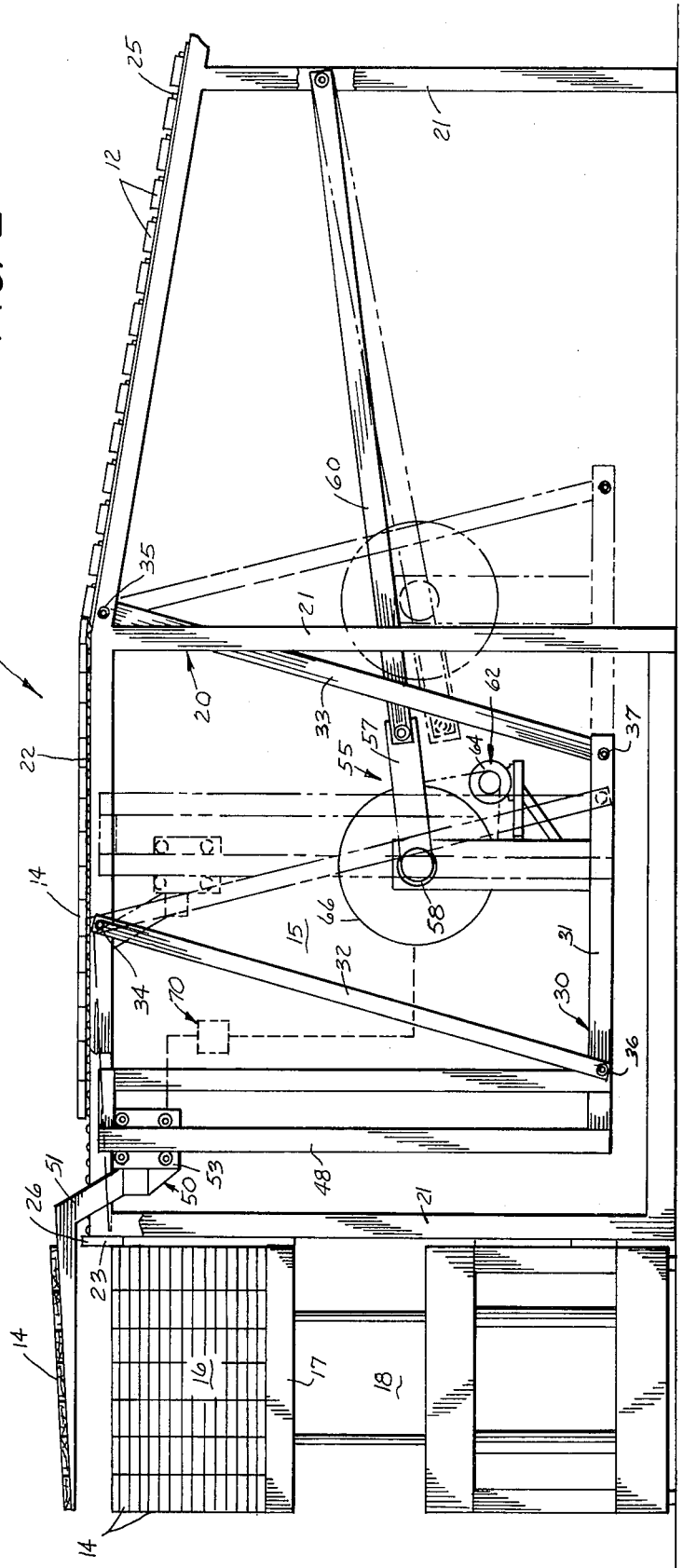
FIG. 2
FIG. 1

4,057,150

LUMBER STACKING APPARATUS

BACKGROUND OF THE INVENTION

This invention relates to the field of art concerning stacking of lumber by automation and more particularly to mechanisms for moving a reciprocating carriage between a course pick-up station a course stacking station.

Many lumber stackers, including the one disclosed in Lunden, U.S. Pat. No. 3,437,215 granted Apr. 8, 1969, utilize a fork arm assembly that is sequentially moved (1) upward at a course formation or pick-up station to pick up a course of boards or lumber, (2) forward to a course stacking station, (3) downward in front of a stripping mechanism, and finally (4) rearward to strip the course from the arm assembly to remove the course and allow the course to fall onto the stack.

Generally the forked arm assembly is carried on a reciprocating carriage that is moved back and forth in a track arrangement. The greatest energy requirements in moving the carriage occur during the initial phase of the forward and back stroke in which energy is required to initiate acceleration of the carriage. Also, additional energy is required to raise the forked arm assembly at the beginning of the forward stroke and to strip the course off the arm assembly at the beginning of the rearward stroke. Furthermore, additional energy is required to overcome the frictional loss of the carriage as it moves in the track arrangement.

One of the principal objects of this invention is to provide a unique carriage drive system that reduces the energy requirements in moving the carriage plus enables the carriage to be moved at a smooth acceleration at the beginning of the stroke and at a smooth de-acceleration at the end of the carriage travel.

An additional object of this invention is to provide unique carriage drive system for lumber stacking apparatus that not only conserves energy but is relatively inexpensive to construct and requires less maintenance.

A further object of this invention is to provide a lumber stacking apparatus having a unique carriage drive system that reduces the horsepower requirements in operating the device and which is capable of storing energy for subsequent use in the operation.

A still further object of this invention is to provide a lumber stacking apparatus having a very smooth carriage drive system that is capable of storing energy both at the beginning and end of reciprocating strokes.

These and other objects and advantages of this invention will become apparent upon reading the following detailed description of a preferred embodiment.

BRIEF DESCRIPTION OF THE DRAWINGS

Preferred and alternate embodiments of this invention are illustrated in accompanying drawings, in which:

FIG. 1 is a fragmentary elevational view of a lumber stacking apparatus showing a carriage that is reciprocally mounted for movement in a stroke between a course pick-up station and a course stacking station with the carriage shown in solid line at the course stacking station and in dotted line at the course pick-up station;

FIG. 2 is a schematic graph showing curves relating the vertical position of the longitudinal position of the carriage and of a lumber support means during the operation of the lumber stacking apparatus illustrated in FIG. 1.

DETAILED DESCRIPTION OF PREFERRED AND ALTERNATE EMBODIMENTS

Figure 3:
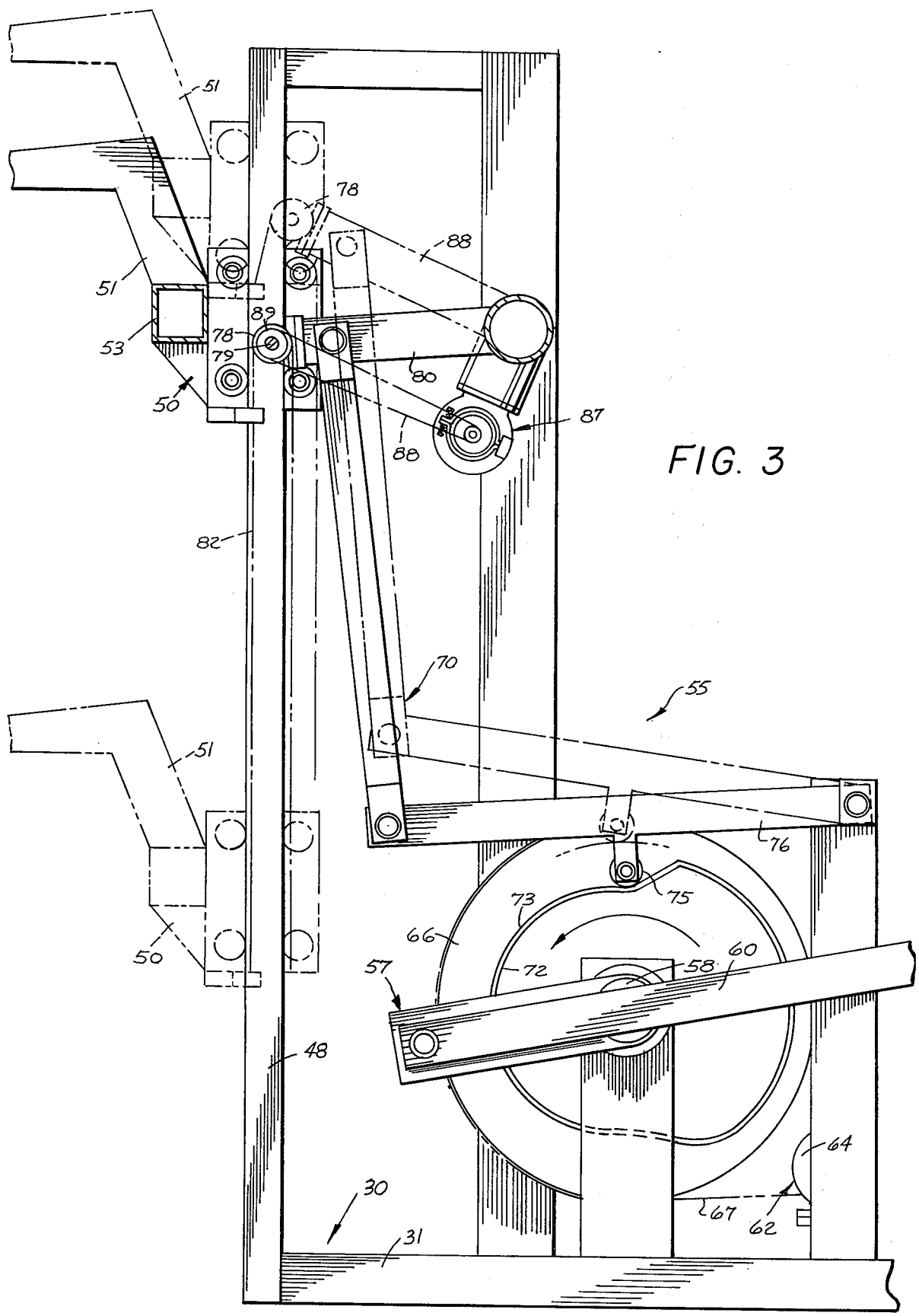
FIG. 3 is a fragmentary elevational view of a portion of the lumber stacking apparatus illustrated in FIG. 1 showing the interconnection between the carriage drive and means for elevating the course support means with an alternate hoistless configuration.

Referring now is more detail to FIG. 1, there is shown a lumber stacking apparatus generally designated by the number 10. The lumber stacking apparatus individually receives boards 12 and forms the boards into a course 14 at a course pick-up station 15. The apparatus 10 then picks up the course at the course pick-up station 15 and carries the course to a course stacking station 18 and lowers the course and places the course on a stack 16. This stack 16 is formed on a hoist or receiving platform 17. The apparatus 10 may be of the hoist type illustrated in FIG. 1 or it may be of the hoistless configuration that is generally described in the Lunden U.S. Pat. No. 3,437,215 granted Apr. 18, 1969, which is incorporated herein as background material relating to hoistless lumber stacking equipment The lumber stacking apparatus 10 has a general frame 20 that includes uprights 21 that support a course forming surface 22. The frame has stripping elements 23 along the front thereof for stripping the course and allowing the course to fall onto the stack 16. The general frame carries an infeed conveyor 25 that individually feeds the boards 12 to the course forming surface 22. Stops 26 are formed at the front of the general frame 22, causing individual boards to abut against the stop and back up to form the course 14.

The apparatus 10 includes a carriage 30 that is reciprocatively mounted on the apparatus 10 for movement between the course pick-up station 15 and the course stacking station 18. The carriage 30 includes a frame 31 with parallel linkages 32 and 33 interconnecting the carriage frame 31 to the general frame 20. The parallel linkages 32 and 33 pivotally interconnect the carriage frame 31 and the general frame 20 at pivot points 34-37 respectively to cause the carriage to swing in an arcuate path or stroke 40 (FIG. 2) from a back elevated position 41 at the course pick-up station downward through an intermediate low point position 43 and then upward to a forward elevated position 45 at the course stacking station 18. During the rearward stroke, the carriage moves from the forward elevated position 45 at the course stacking station through the low-point position 43 and then back up to the elevated position 41 at the course pick-up station. The arcuate path 40 of the carriage is illustrated in schematic form in FIG. 2. In a preferred embodiment the pivot points 34-37 are located at desired locations with respect to the course pick-up station 15 and the course stacking station 18 so that the low-point position 43 is midway between the respective stations 16 and 18.

Consequently it can be stated that energy is stored in the carriage at the elevated positions 41 and 45 to assist in the longitudinal movement of the carriage between the course pick-up station 15 and the course stacking station 18. The energy required to initially accelerate the carriage from the course pick-up station 15 or from the course stacking station 18 is reduced by the stored energy of the carriage in the elevated positions 41 and 45 respectively. Additionally, the braking energy required to stop the movement of the carriage 30 at the end of its forward and rearward strokes is reduced as the carriage moves upward converting kinetic energy to potential energy.

The carriage frame 31 includes a vertical track 48 fixed thereto that is maintained in a vertical orientation as the carriage swings back and forth between the course pick-up station 15 and the course stacking station 18. A course support means 50 is mounted on the vertical track 58 for vertical movement for picking up a course 14 at the course pick-up station 15 and carrying the course 14 to the course stacking station 18 and depositing the course on the stack 16. The course support means 50 includes a forked arm assembly 51 that has arms that extend upward and forward from a base 53. Base 53 has rollers thereon for enabling the course support means 50 to move vertically along the vertical track 48.

The assembly 10 includes a carriage drive means 55 that is operatively connected between the frame 20 and the carriage 30 for reciprocating the carriage between the course pick-up station 15 and the course stacking station 18. The carriage drive means 55 includes a crank assembly 57 having a crank shaft 58 rotatably mounted on the carriage frame 31. The crank assembly 57 includes an articulating crank arm 60 that extends from the crank shaft 58 to the frame 20. The crank assembly 57 includes a crank drive means 62 that is mounted on the carriage frame 31 having a motor 64. The motor 64 is operatively connected to the crank shaft 58 through a sprocket 66 affixed to the shaft 58 with a chain 67 interconnecting the motor 64 and drive sprocket 66. The crank assembly 57 provides for very smooth acceleration at the beginning of the stroke and very smooth de-acceleration at the end of the stroke.

The apparatus 10 includes an elevating means 70 for raising the course support means 50 at the course pick-up station 15 to pick up a course 14 from the surface 22 and maintaining the course elevated as the carriage 30 moves forward from the course pick-up station 15 to the course stacking station 18 and for lowering the course 14 at the course stacking station 18 and maintaining the course support means 50 in a lower condition as the carriage moves rearward from the course stacking station 18 back to the course pick-up station 15. In a preferred embodiment, the elevated means 70 is operatively connected to the carriage drive means 55 for operating in response to the angular movement of the crank shaft 58 about the crank axis for elevating the course support means 50 at the course pick-up station 15 and for lowering the course support means 50 at the course stacking station 18.

The elevating means 70, in a preferred form, includes a cam 72 (FIG. 3) that is operatively affixed to the crank shaft 58. In a preferred form, the cam 72 is mounted on the shaft sprocket 66 as illustrated in FIG. 3. The cam 72 has an irregular contour surface 73 that is designed in relation to the depth of the arcuate swing 40 between the elevated position 41 and 45 and the intermediate low positions 43 and also with respect to the unique characteristics of the articulating crank arm 60 so that the course support means 50 is elevated quickly during the initial phase of rotation of the crank shaft 58 and maintains the course support means 50 elevated during the forward movement of the carriage 50 (FIG. 2) The cam surface 73 is further designed to enable the course support means 50 to drop at the course stacking station 18 in front of stripping elements 23 and for maintaining the course support means 50 in the lowered condition as the carriage 30 is reciprocated back from the stacking station 18.

The elevating means includes a cam follower 75 that engages the contour surface 73 and moves vertically in response thereto. The cam follower is mounted on a lever mechanism 76 for interconnecting the cam follower 75 and the forked arm assembly 51.

The elevating means 70 further includes a chain sprocket 78 that is mounted on a shaft 79. The shaft 79 is mounted on the end of a pivotal lever 80. The lever mechanism 76 extends from the cam follower 75 to the pivoted lever 80 to cause lever 80 to pivot vertically in response to the vertical movement of the cam follower 75 on the cam surface 73. An elevating chain 82 is mounted over the chain sprockets 78 with one end of the chain 82 operatively connected to the forked arm assembly 51. In a hoist type configuration as shown in FIG. 1, the other end of the chain 82 (not shown) may be affixed to carriage frame 31 so that as the lever arm 80 is pivoted upward it automatically raises the forked arm assembly 51. Alternatively, the shaft 79 may be fixed from rotation to cause the forked arm assembly 51 to move vertically in direct response to the vertical pivotal movement of lever 80.

In a hoistless type configuration as illustrated in FIG. 3, the elevating means 70 further includes a motor-gear box assembly 87 mounted on the lever 80. A chain 88 extends from the motor gear box assembly 87 to a sprocket 89 that is fixed to the shaft 79. Consequently, in a hoistless type configuration, the motor-gear box assembly 87 is activated to drive the chain 88 to rotate the shaft 79 to lower the forked arm assembly 51 downward at the course stacking station 18 until the arm assembly is immediately above the top of the stack. After the carriage is reciprocated rearward to the course pick-up station 15 then the motor 87 is energized to rotate the shaft 79 in the opposite direction to raise the forked arm assembly 51 upward to a position immediately below the surface 22 in preparation for a subsequent cycle. In a hoist type design, as illustrated in FIG. 1, the motor-gear assembly 87 may be deleted.

The path of the course support means 50 is depicted in FIG. 2 with the elevated forward stroke designed by the numeral 91 and the lowered rearward stroke designated with the numeral 92.

During the initial portion of the carriage stroke, sufficient peak energy is required to initially accelerate the carriage from a stationary position, plus raise the forked arm assembly 51 vertically upward to lift a course of boards from the surface 22. After the initial acceleration, the energy requirement diminishes. Secondly, a large peak energy requirement is necessary at the beginning of the backstroke to initially accelerate the carriage in a rearward movement, plus strip the course from the forked arms.

The lumber stacking apparatus as described above provides for a very unique arrangement in which energy is stored in the carriage in position 41 and 45 for assisting the carriage drive means 55 during the initial movement of the carriage in the forward stroke from the course pick-up station and during the initial movement of the carriage in the rearward stroke from the course stacking station. The energy stored in the elevated carriage 30 at both positions 41 and 45 greatly reduces the energy required to operate the apparatus. The applicant has found that the energy required in moving the carriage utilizing this unique design is approximately fifty percent less than in a conventional design. The hp size of the motor 64 may be reduced accordingly.

Not only is the energy required to operate the apparatus significantly reduced, but the maintenance and wear of the moving carriage parts is reduced, providing for a longer life with fewer maintenance problems.

Furthermore, since the carriage moves upward during the latter phases of both the forward and rearward strokes, gravitational forces assist the carriage drive means 55 to smoothly de-accelerate the carriage with less braking energy required. Thus less braking capability is required in the drive means, which additionally reduces the brake maintenance. Consequently, not only is less energy required to accelerate the carriage in either direction but less energy is required to smoothly stop the movement of the carriage at the end of the forward and rearward stroke.

It should be understood that the above described embodiments are simply illustrative of the principles of this invention and that numerous other embodiments may be readily devised without deviating therefrom. Therefore, only the following claims are intended to define this invention.

What is claimed is:

1. A lumber stacking apparatus, comprising:
   a frame;
   a carriage operatively mounted on the frame;
   parallelogram linkages interconnecting the carriage and the frame for enabling the carriage to swing back and forth in an arcuate path between a course pick-up station and a course stacking station while maintaining the carriage horizontal during the swinging movement;
   carriage drive means operatively connected to the carriage for moving the carriage back and forth between the course pick-up station and the course stacking station;
   course support means mounted on the carriage for vertical movement with respect to the carriage for carrying a lumber course from the course pick-up station to the course stacking station; and
   means operatively connected to the course support means for (1)
   elevating the course support means at the course pick-up station to pick up a course of lumber, and (2) maintaining the course support means elevated while the carriage is being swung from the course pick-up station to the course stacking station to carry the course of lumber to the course stacking station.

2. The lumber stacking apparatus as defined in claim 1 wherein the parallelogram linkages interconnect the carriage to the frame at desired locations causing the carriage to swing downward from the course pick-up station and the course stacking station to an intermediate low point and to swing upward from the intermediate low point to the course pick-up station and the course stacking station to enable gravitational forces to assist the carriage drive means in: (1) initially accelerating the forward and backward movement of the carriage from the course pick-up station and the course stacking station respectively; and (2) de-accelerating the forward and backward movement of the carriage as the carriage approaches the course stacking station and the course pick-up station respectively thereby reducing the energy requirements of the carriage drive means.

3. The lumber stacking apparatus as defined in claim 1 wherein the carriage drive means includes:
   a crank shaft rotatable about a crank axis;
   a crank arm operatively interconnecting the carriage and the frame from moving the carriage back and forth in response to the rotation of the crank shaft; and
   crank motor means operatively connected to the crank shaft for rotating the crank shaft about the crank axis.

4. The lumber stacking apparatus as defined in claim 3 wherein the crank shaft and the crank motor means are mounted on the carriage for reciprocating movement therewith.

5. The lumber stacking apparatus as defined in claim 3 wherein the means for elevating the course support means includes;
   a cam operatively connected to the crank shaft for rotation therewith in which the cam has a selected contour;
   a cam follower engaging the cam contour; and
   lever mechanism means operatively interconnecting the cam follower and the course support means for elevating the course support means in response to the contour of the cam.

6. The lumber stacking apparatus as defined in claim 1 wherein the carriage includes a vertical track and wherein the course support means is mounted on the track for vertical movement with respect to the carriage and wherein the means for elevating the course support means includes:
   a chain sprocket mounted on the carriage for vertical movement with respect to the carriage;
   a chain extending over the sprocket with one end affixed to the course support means;
   a cam operatively connected to the carriage drive means for movement in response to the operation of the carriage drive means, said cam having a desired contour;
   a cam follower engaging the cam along the desired contour; and
   lever mechanism means operatively interconnecting the cam follower and the chain sprocket for vertically moving the chain sprocket in response to the movement of the cam follower along the cam contour.

* * * * *